June 3, 1969 J. H. BIRCHER 3,447,685
PUMP AND FILTER UNIT
Filed Dec. 7, 1966 Sheet 3 of 3
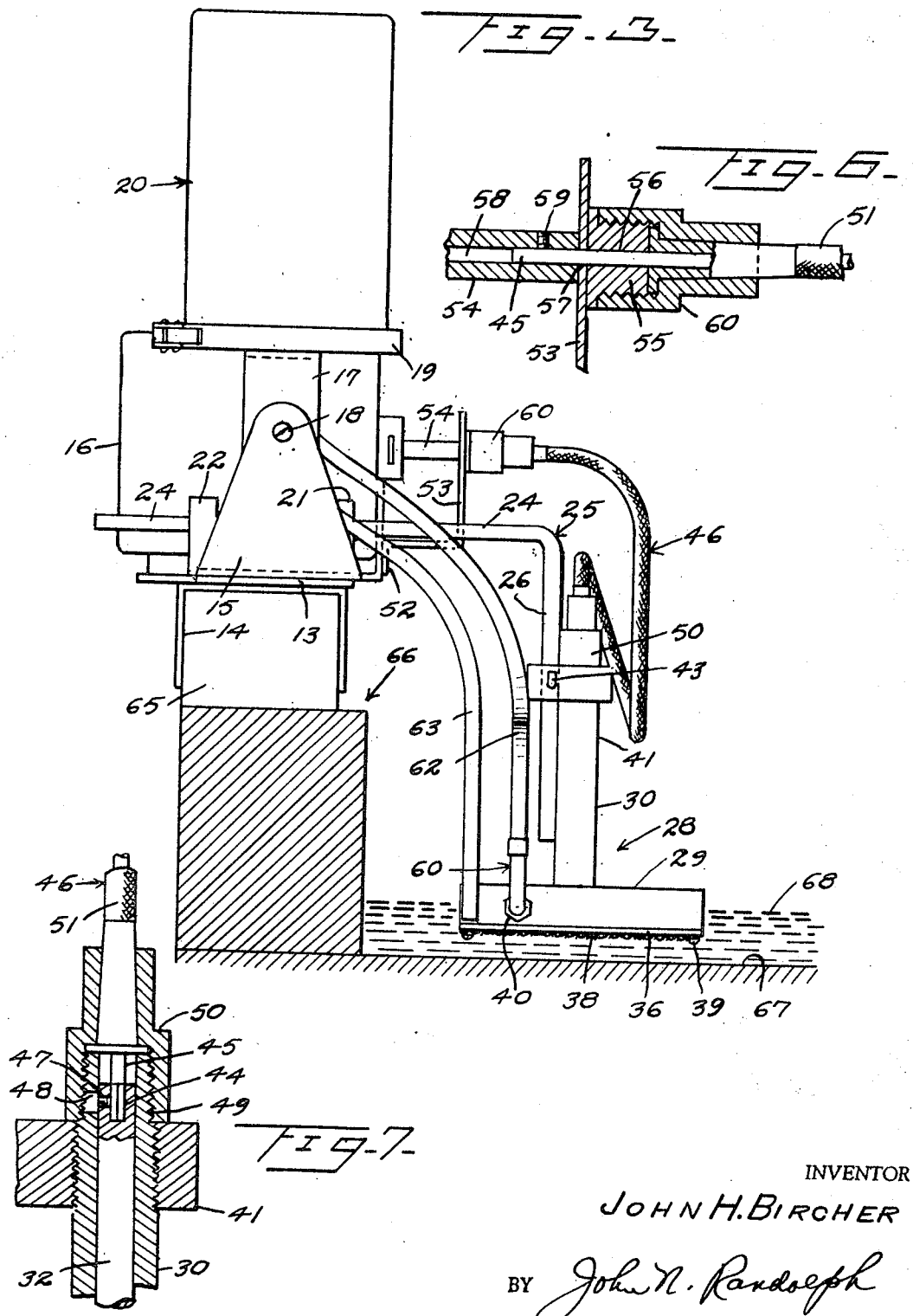
INVENTOR
JOHN H. BIRCHER
BY John N. Randolph
ATTORNEY

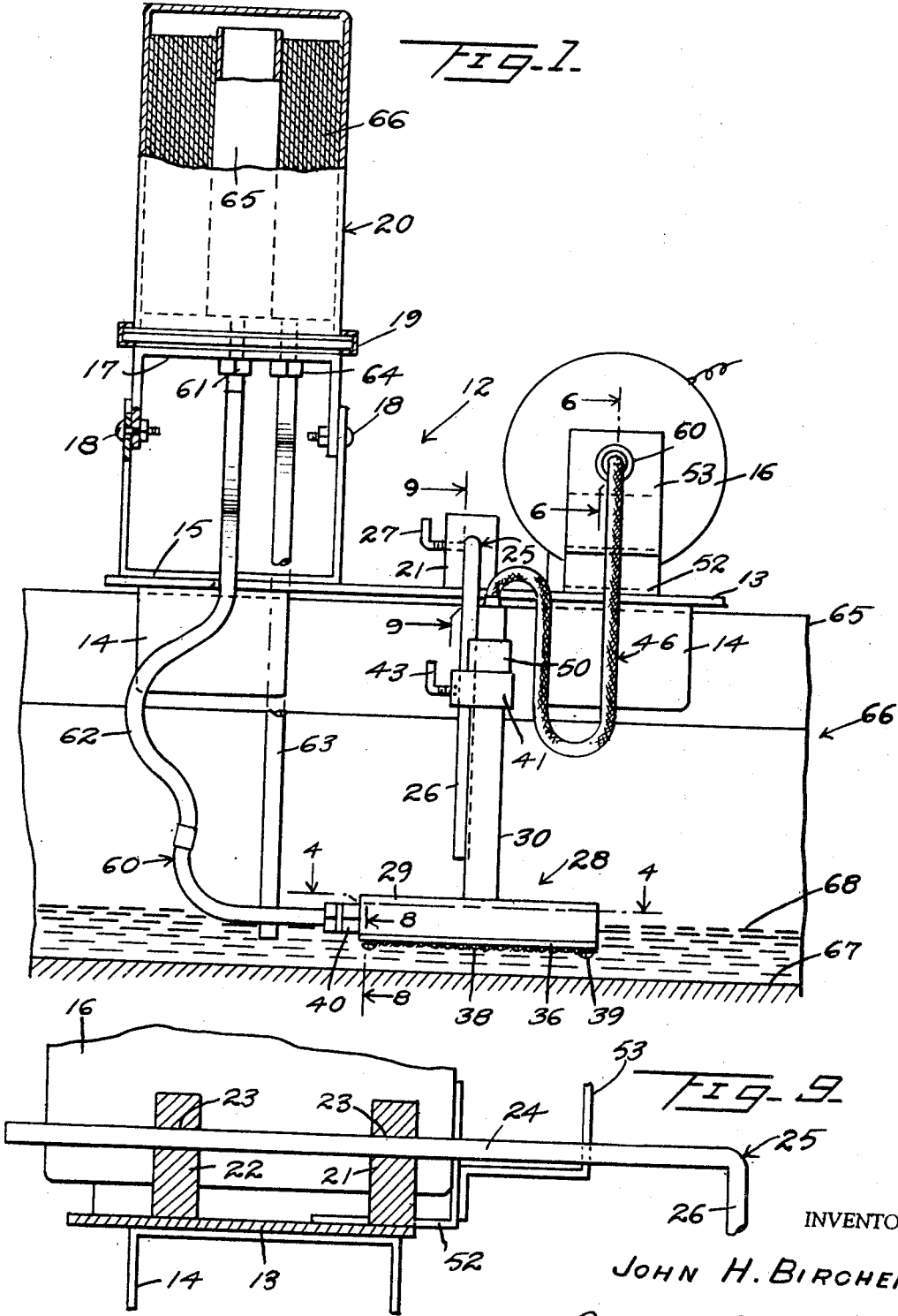

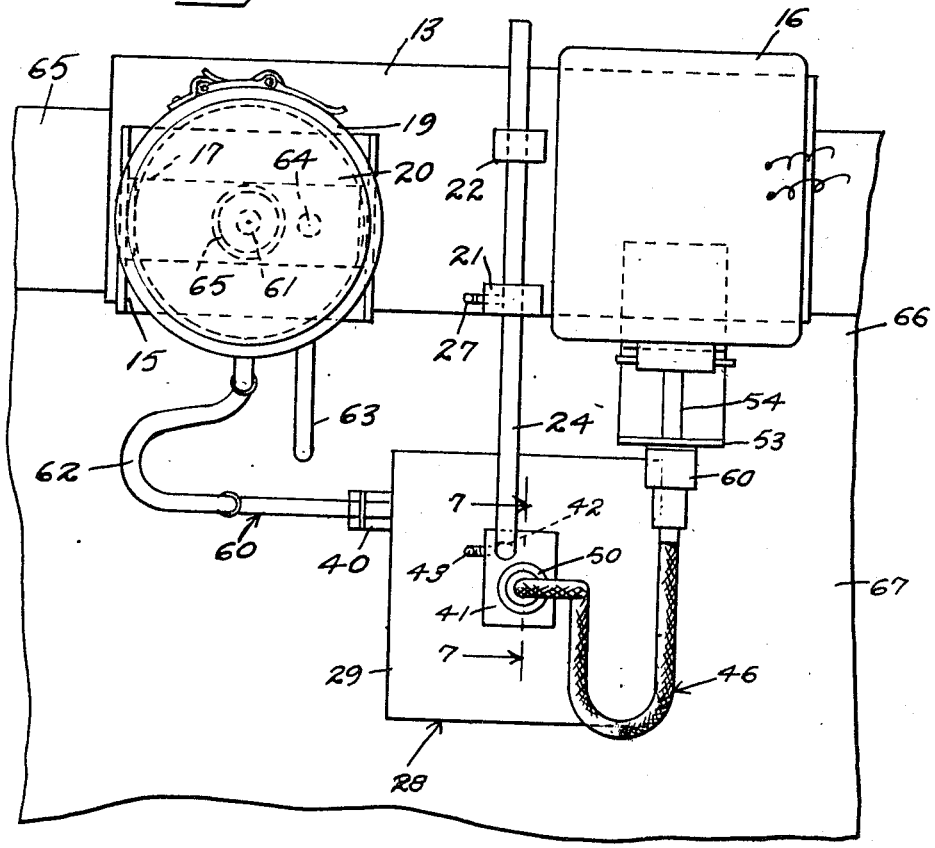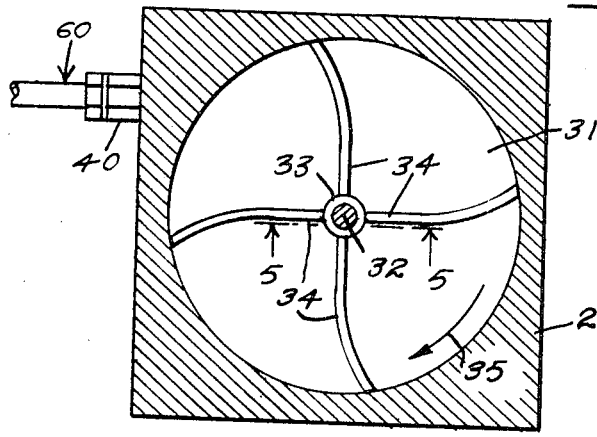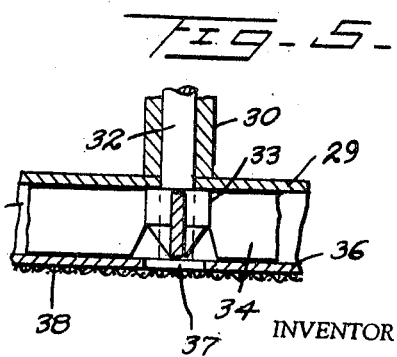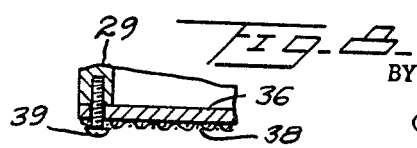

United States Patent Office 3,447,685
Patented June 3, 1969

3,447,685
PUMP AND FILTER UNIT
John H. Bircher, Ellsworth, Kans.
(Box 31, Somers, N.Y. 10589)
Filed Dec. 7, 1966, Ser. No. 599,896
Int. Cl. C02c 1/18
U.S. Cl. 210—167                                    1 Claim

ABSTRACT OF THE DISCLOSURE

A pump and filter unit capable of operating while a deep fryer is cooking food for filtering impurities from the oil before such impurities can be cooked into the oil, to thereby greatly increase the usable life of cooking oils. The unit is constructed as an attachment which may be readily applied to conventional deep fry cookers to function therewith, without in any way modifying the fryer. The pump can be readily adjusted with respect to the remainder of the unit so as to center the pump relative to the cooking receptacle and to position the pump at least partially submerged in the cooking oil.

---

A primary object of the invention is to provide an attachment which can be easily and quickly applied to or removed from a conventional deep fryer for filtering the cooking oil while the fryer is in operation, and which is capable of being adjusted to most advantageously locating a pump thereof in a centered position at least partially submerged in the oil.

Another object of the invention is to provide such a unit which may be readily mounted detachably on a part of the fryer without requiring any modification of the fryer.

Still another object of the invention is to provide such a unit which may be utilized for cleaning and maintaining in a clean condition various liquids, including oil, water and solvents, while such liquids are being used and are being subjected to heat.

Various other objects and advantages of the invention will hereinafter become more fully apparent from the following description of the drawings, illustrating a presently preferred embodiment thereof and wherein:

FIGURE 1 is a fragmentary front elevational view, partly in vertical section, showing the pump and filter unit in an operative position, applied to a conventional deep fryer;

FIGURE 2 is a top plan view thereof;

FIGURE 3 is a side elevational view looking from left to right of FIGURE 1;

FIGURE 4 is an enlarged horizontal sectional view taken substantially along the line 4—4 of FIGURE 1;

FIGURE 5 is an enlarged fragmentary vertical sectional view through the pump, taken substantially along the line 5—5 of FIGURE 4;

FIGURE 6 is an enlarged fragmentary vertical sectional view taken substantially along the line 6—6 of FIGURE 1;

FIGURE 7 is an enlarged fragmentary vertical sectional view taken substantially along a plane as indicated by the line 7—7 of FIGURE 2;

FIGURE 8 is an enlarged fragmentary vertical sectional view taken substantially along a plane as indicated by the line 8—8 of FIGURE 1, and FIGURE 9 is an enlarged fragmentary vertical sectional view taken substantially along the line 9—9 of FIGURE 1.

Referring more specifically to the drawings, the pump and filter unit in its entirety and comprising the invention is designated generally 12 and includes an elongated mounting plate 13 having a spring clamp 14 secured adjacent each end thereof to its underside and crosswise thereof. An U-shaped bracket 15 is secured in any conventional manner to the upper side of one end of the mounting plate 13 and longitudinally thereof. A conventional electric motor 16 is mounted on and secured in any conventional manner to the upper side of the other end of the mounting plate 13 and is disposed crosswise thereof.

The depending legs of an arch-shaped bracket 17 are secured to the upstanding legs of the bracket 15 by nut-and-bolt fastenings 18. The base 19 of a conventional oil filter 20 is mounted on and supported by the bracket 17. Two blocks 21 and 22 are fixed to and rise from the mounting plate 13, between the U-shaped member 15 and the motor 16 and are disposed in alignment with one another transversely of the mounting plate, as seen in FIGURE 2. The blocks 21 and 22 have aligned bores 23, as seen in FIGURE 9, to slidably receive one straight end portion 24 of a supporting member or rod 25 which has an opposite end 26 which extends downwardly from the end portion 24 and which is disposed approximately at a right angle thereto. A clamping screw 27 is threaded into the block 21 against a part of the rod portion 24 for securing said part adjustably to the block 21.

A pump, designated generally 28, is disposed forwardly of and beneath the mounting plate 13 and includes a pump casing 29. A rigid tubular standard 30 is fixed to and rises from the pump casing 29 and communicates with the chamber 31 thereof. The tube 30 forms a journal for a pump shaft 32 which is fixed to and rises from a hub 33. As seen in FIGURE 4, four corresponding vanes 34 extend radially from the hub 33 and each includes a substantially straight inner portion and a curved outer portion. The outer portions of the vanes 34 are all curved in the same direction and in a direction away from the direction of rotation of said vanes, as indicated by the arrow 35 in FIGURE 4. The hub 33 and vanes 34 form an impeller which is contained in the chamber 31. A bottom wall 36 of the casing 29 has an opening 37 constituting the pump inlet and which is covered by a piece of mesh wire fabric 38. The bottom wall 36 is detachably secured to the casing 29 by fastenings 39, as seen in FIGURE 8, which also secure the mesh wire fabric screen 38 against the underside of said bottom wall 36. The pump casing 29 is provided with an outlet 40 in the side wall of the casing 29, as seen in FIGURE 4.

As seen in FIGURE 7, a block 41 is mounted on and connected to the journal 30, beneath and spaced from its upper end. The block 41 has a vertical bore 42 which is spaced from the tubular member 30 and in which the rod end 26 is slidably received. A clamping screw 43 is threaded into the block 41 and against the rod end 26 for adjustably clamping the block 41 to the support member 25.

As seen in FIGURE 7, the upper end of the pump shaft 32 is provided with a socket 44 to receive one end of a core 45 of a flexible shaft 46, which is secured therein by a set-screw 47. The journal 30 may be provided with an opening 48 through which the set-screw 47 can be applied and removed. The upper end of the journal 30 is externally threaded, as seen at 49, to receive a sleeve nut 50 for securing one end of the tubular casing 51 of the flexible shaft 46 to the journal member 30.

A bracket 52 is secured to and extends forwardly from the mounting plate 13 and has an upstanding wall 53 which is disposed in front of the shaft 54 of the motor 16. An externally threaded boss 55 is fixed to and projects forwardly from the bracket wall 53 and has a bore 56 which aligns with an opening 57 of the wall 53 and a bore 58 of the shaft 54 to receive the other end of the core 45 of the flexible shaft. Said end of the core is secured to the driveshaft 54 by a set-screw 59 which is threaded into the driveshaft, as seen in FIGURE 6. A sleeve nut 60 secures the other end of the flexible shaft casing 51 to the boss 55 and wall 53.

A conduit 60 connects the pump outlet 40 to an inlet 61 of the filter 20. The conduit 60 is preferably formed of steel but includes an intermediate flexible portion 62. A conduit 63, preferably formed of steel, has one end connected to an outlet 64 of the filter 20. The other discharge end of the conduit 63 is preferably located adjacent the pump casing 29.

The spring clamps 14 are adapted to detachably engage over a rear wall 65 of a conventional deep fryer 66 which is partially illustrated in FIGURES 1, 2 and 3, so that the end 26 of the support member 25 will extend downwardly into a cooking receptacle 67 of the fryer 66, which is at least partially filled with a cooking liquid, such as oil, as indicated at 68 in FIGURES 1 and 3. The clamp screw 27 is loosened so that the rod portion 24 can be adjusted in its supporting blocks 21 and 22 for centering the pump 28 between the front and rear walls of the cooking receptacle 67, and the clamping screw 43 is loosened to adjustably locate the supporting block 41 on the depending rod end 26 for adjusting the level of the pump casing 29, so that it will be at least partially submerged in the liquid 68. Sufficient slack is provided in the flexible portion 62 and in the flexible shaft 46 to accommodate these adjustments after which the clamping screws 27 and 43 are tightened for immovably locating the pump 28 relative to the mounting plate 13.

While food, not shown, is being cooked in the oil 68 contained in the receptacle 67, the motor 16 drives the flexible shaft core 45 for causing the vanes 34 to receive clockwise, as indicated by the arrow 35 in FIGURE 4, for drawing oil into the chamber 31 through the inlet 37 and for forcing the oil from the chamber 31 through the conduit 60 and inlet 61 into the filter 20. As seen in FIGURE 1, the inlet 61 opens into a central tubing 65 of the oil filter 20, which is of conventional construction, and is forced upwardly to discharge from the upper end thereof onto the upper end of a filter element 66 which surrounds the tubing 65 and which preferably comprises a wound roll of tissue paper. The oil flows downwardly through the filter element 66 to the outlet 64 which communicates with the chamber of the filter containing said filter element 66, and then flows through the conduit 63 back into the receptacle 67. The mesh wire fabric screen 38 functions as a strainer to prevent particles of the food being cooked or other objects entering the chamber 31 and possibly clogging the conduit 60, the outlet 40 or the inlet 61. The parts of the pump 28 including the part of the conduit 60 leading from the outlet 40 and which is submerged in the oil 68 are formed of materials capable of withstanding the heat of the oil, so that the oil can be cleansed and maintained clean during the entire cooking operation. As a result, the usable life of the cooking oil 68 is substantially increased.

I claim as my invention:

1. A pump and filter unit comprising a mounting plate, means detachably clamping the mounting plate on a wall of a deep fryer, a liquid filter supported by said mounting plate, an electric motor immovably supported on the mounting plate, a pump, means connected to the mounting plate and to the pump for supporting the pump remote from the mounting plate in a liquid to be pumped and with the pump axis disposed at an angle to the motor axis, means forming a driving connection between the motor and pump for driving the pump when the motor is energized, a conduit through which the liquid is conveyed from the pump to the filter, a return conduit leading from the filter and discharging back into the liquid in which the pump is submerged, said pump supporting means including a rod having a first end and a second end disposed at an angle to the first end and extending downwardly therefrom, means adjustably connecting said first end to the mounting plate for horizontally adjusting the location of the second end relative to the mouting plate, and means carried by the pump and adjustably connected to said second end for vertically adjusting the pump relative to the mounting plate.

References Cited

UNITED STATES PATENTS

| | | | |
|---|---|---|---|
| 552,951 | 1/1896 | Bower | 248—70 |
| 2,578,129 | 12/1951 | Daugherty | 99—408 |
| 3,121,473 | 2/1964 | Blystone | 210—172 |
| 3,356,218 | 12/1967 | Grudoski | 210—167 |

REUBEN FRIEDMAN, *Primary Examiner.*

T. A. GRANGER, *Assistant Examiner.*

U.S. Cl. X.R.

99—408